US009923380B2

(12) United States Patent
Yang et al.

(10) Patent No.: US 9,923,380 B2
(45) Date of Patent: Mar. 20, 2018

(54) CAPACITIVE ELEMENT COUPLING IN WIRELESS POWER

(71) Applicants: Songnan Yang, San Jose, CA (US); Janardhan Koratikere Narayan, Fremont, CA (US); Sreenivas Kasturi, Hillsboro, OR (US); Jonathan Rosenfeld, Portland, OR (US); Masud Hannan, Hillsboro, OR (US)

(72) Inventors: Songnan Yang, San Jose, CA (US); Janardhan Koratikere Narayan, Fremont, CA (US); Sreenivas Kasturi, Hillsboro, OR (US); Jonathan Rosenfeld, Portland, OR (US); Masud Hannan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 859 days.

(21) Appl. No.: 14/201,088

(22) Filed: Mar. 7, 2014

(65) Prior Publication Data
US 2015/0255988 A1 Sep. 10, 2015

(51) Int. Cl.
H02J 17/00 (2006.01)
H02J 5/00 (2016.01)
H02J 50/60 (2016.01)
H02J 50/12 (2016.01)

(52) U.S. Cl.
CPC .............. *H02J 5/005* (2013.01); *H02J 17/00* (2013.01); *H02J 50/60* (2016.02); *H02J 50/12* (2016.02)

(58) Field of Classification Search
CPC .................................. H02J 50/60; H02J 50/05
See application file for complete search history.

(56) References Cited

U.S. PATENT DOCUMENTS

2011/0090030 A1* 4/2011 Pagani ................ H04B 5/0012
333/24 R
2011/0309986 A1 12/2011 Ying
2014/0197693 A1* 7/2014 Fujita ...................... H02J 7/025
307/104

(Continued)

FOREIGN PATENT DOCUMENTS

CN 1739218 A 2/2006
CN 103380566 A 10/2013
JP 2012070574 A 4/2012

(Continued)

OTHER PUBLICATIONS

Dictionary.com "interdigit," in The American Heritage® Science Dictionary. Source location: Houghton Mifflin Company. http://www.dictionary.com/browse/interdigit. Available: http://www.dictionary.com/. Accessed: Mar. 4, 2017.*

(Continued)

*Primary Examiner* — Daniel Cavallari
(74) *Attorney, Agent, or Firm* — International IP Law Group, P.L.L.C.

(57) ABSTRACT

Techniques of capacitive coupling in a wireless power system are described herein. The techniques may include forming a transmitting coil to be inductively coupled to a receiving coil of a device under charge (DUC). The techniques may include forming a capacitive element of the transmitting coil to be capacitively coupled to a conductive component of the DUC.

24 Claims, 9 Drawing Sheets

400A

(56) References Cited

U.S. PATENT DOCUMENTS

2014/0210276 A1    7/2014  Shinoda et al.
2014/0292103 A1*  10/2014  Waffenschmidt .... H04B 5/0012
                                                          307/109

FOREIGN PATENT DOCUMENTS

| WO | 2012101907 A | 8/2012 |
| WO | 2012157374 A1 | 11/2012 |
| WO | 2013061612 A1 | 5/2013 |
| WO | WO2013061899 A1 | 4/2015 |

OTHER PUBLICATIONS

Chinese Search Report, CN Application No. 201510062699.9, dated Oct. 26, 2016, 2 pages.
Taiwan IPO Search Report for Taiwan Invention Patent Application No. 104103423, dated Aug. 3, 2016, 2 pages.
Chinese Search Report, CN Application No. 201510062699.9, dated Jun. 28, 2017, 2 pages.

* cited by examiner

100A

100B

100C

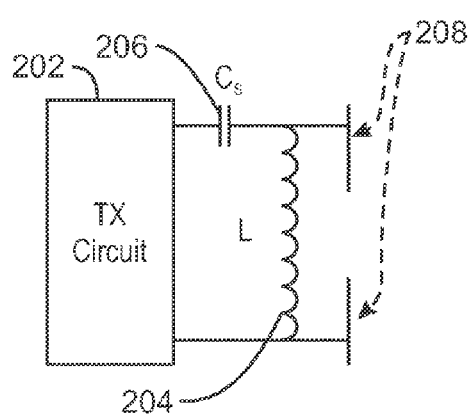
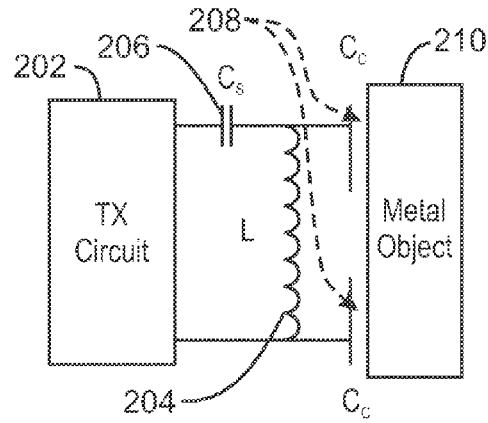
FIG. 2A    FIG. 2B
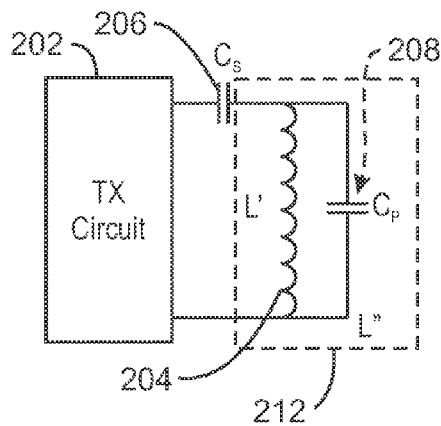
FIG. 2C

400A

400B

508

510

512

600

CAPACITIVE ELEMENT COUPLING IN WIRELESS POWER

TECHNICAL FIELD

This disclosure relates generally to techniques for wireless charging. Specifically, this disclosure relates to capacitive coupling of a capacitive element to a conductive element of a device under charge.

BACKGROUND ART

Magnetic resonance wireless charging may employ a magnetic coupling between a transmit (Tx) coil and a receive (Rx) coil. The Tx coil and the Rx coil may be coupled based on a resonant inductive coupling wherein electrical energy is transmitted from the Tx coil to the Rx coil by an inductive couple due to each coil being tuned to resonate at a substantially similar frequency. In some scenarios, a Tx coil may be detuned when a magnetic field associated with the Tx coil interacts with conductive components, such as a metal chassis, of a receiving device. For example, if a device under charge has a metal component that interacts with the magnetic field of a Tx coil, an Eddy current may be induced on the metal component, wherein a reactive magnetic field of opposite direction to the magnetic field of the Tx coil is generated. In this scenario, the detuning of the Tx coil, by way of the reactive magnetic field, results in a lower power transfer efficiency.

BRIEF DESCRIPTION OF THE DRAWINGS

FIG. 2A is diagram illustrating a capacitive element in parallel to a transmitter coil;

FIG. 2B is a diagram illustrating the capacitive element coupled to a conductive element in parallel to the transmitting coil;

FIG. 2C is a diagram illustrating a circuit equivalent to the diagram of FIG. 2B;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for adjusting for variations of inductance in a wireless charging system. As discussed above, magnetic resonance wireless charging systems may employ an inductive coupling between a transmit (Tx) coil and a receive (Rx) coil, wherein a device under charge (DUC) may include conductive components resulting in variations of the inductive coupling when a magnetic field of the Tx coil interacts with the conductive components. The techniques described herein include a capacitive element configured to be capacitively couple to a conductive element of the DUC. In some aspects, the capacitive coupling between the capacitive element and the conductive component may at least partially compensate for the variations of the inductive coupling.

Figure 1A:
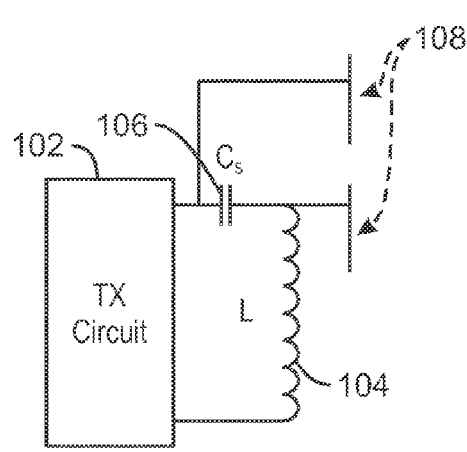
FIG. 1A is diagram illustrating a capacitive element in series to a transmitter coil.

FIG. 1A is diagram illustrating a capacitive element in series to a transmitter coil. The Tx circuit 102 may include a Tx coil 104, a tuning capacitor 106, and a capacitive element 108. The tuning capacitor 106 may be configured to tune the Tx coil to resonate at a desired frequency associated with a given Rx coil. However, the Tx coil 104, having an inductance "L" with an Rx coil (not shown), may interact with a conductive component of a DUC as discussed below in relation to FIG. 1B.

The resonant frequency "$f_0$" may be defined by Equation 1 below:

$$f_0 = \frac{1}{2\pi\sqrt{LC}} \qquad \text{Eq. 1}$$

In Equation 1, L is the inductance before any conductive element is introduced, and "C" is the capacitance of the tuning circuit, or $C_s$ as indicated in FIG. 1A.

Figure 1B:
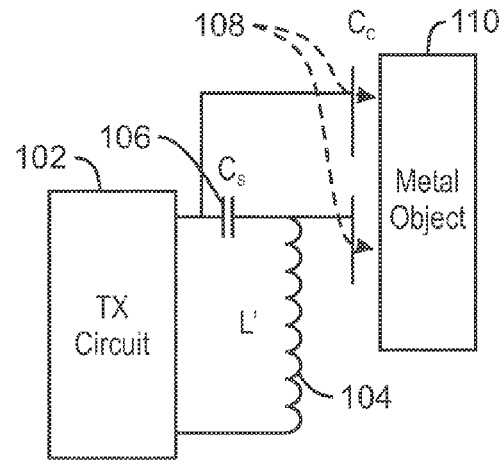
FIG. 1B is a diagram illustrating the capacitive element coupled to a conductive element.

FIG. 1B is a diagram illustrating the capacitive element coupled to a conductive element. A conductive element 110 may be a component or a portion of a DUC. In some aspects, a conductive element 110 is a metal object, such as a metal chassis, a battery, and the like, as indicated in FIG. 1B. The inductance "L" of the Tx coil 104 is reduced by "ΔL" as a result of an interaction between the Tx coil 104 and the conductive element 110. Therefore, the inductance "L'" is equal to L−ΔL. The coupling capacitance (denoted as $C_c$ in FIG. 1B) formed between the metal object 110 and capacitive element 108 may at least partially compensate for the resonance frequency change due to any inductance reduction ΔL caused by the conductive component 110.

Figure 1C:
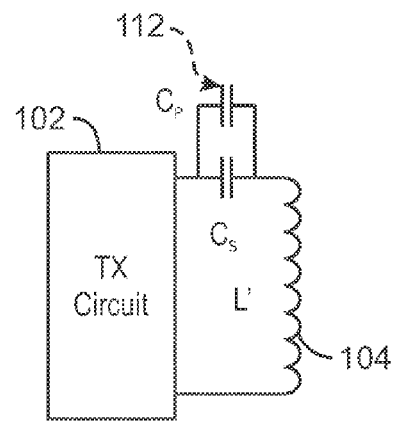
FIG. 1C is a diagram illustrating a circuit equivalent to the diagram of FIG. 1B.

FIG. 1C is a diagram illustrating a circuit equivalent to the diagram of FIG. 1B. The capacitance formed between capacitive elements 108 in FIG. 1B and metal objects are equivalent to adding the capacitor 112 in FIG. 1C, also denoted as $C_p$ that is defined by Equation 2 below:

$$C_p = C_c/2 \qquad \text{Eq. 2}$$

In Equation 2, $C_c$ is the coupling capacitance formed between the metal object 110 and capacitive element 108 as indicated in FIG. 1B. The resulting resonant frequency $f_2$ in FIG. 1B and in the equivalent circuit illustrated in FIG. 1C is defined by Equation 3 below:

$$f_2 = \frac{1}{2\pi\sqrt{L'(C+C_p)}} \approx f_0 \qquad \text{Eq. 3}$$

Therefore, as discussed above, any change in the resonant frequency of the Tx coil 104 may be at least partially adjusted by the introduction of the capacitive elements 108.

In addition to the series connection of capacitive elements described in FIGS. 1A, 1B, and 1C, and as discussed below in reference to FIG. 3, the capacitive elements may also be connected to the Tx coil in a parallel configuration as discussed below in reference to FIGS. 2A, 2B, 2C and FIGS. 4A and 4B.

FIG. 2A is diagram illustrating a capacitive element in parallel to a transmitter coil. The Tx circuit 202 may include a Tx coil 204, the tuning capacitor 206, and a capacitive element 208. As discussed above in reference to FIGS. 1A-1C, the tuning capacitor 206 may be configured to tune the Tx coil 204 to resonate at a desired frequency, such as the frequency $f_0$, defined by Equation 1. In this scenario, the capacitive element is disposed in parallel in relation to the Tx coil 204 as discussed in more detail below.

FIG. 2B is a diagram illustrating the capacitive element coupled to a conductive element in parallel to the transmitting coil. In this example, the capacitance $C_c$ is indicated in FIG. 2B, and an resulting inductance L" of the capacitive elements 208 in view of the metal object 210 is defined by Equation 4 below:

$$L'' = \frac{L'}{(1 - 4\pi^2 f^2 L' C_p)} \quad \text{Eq. 4}$$

FIG. 2C is a diagram illustrating a circuit equivalent to the diagram of FIG. 2B. As illustrated in FIG. 2C by the dashed box 212, the equivalent capacitive element 208 is in parallel to the Tx coil 204.

In either a parallel configuration, such as in FIGS. 2A-2C, or in a series configuration, such as in FIGS. 1A-1C, the capacitance formed between the capacitive elements and metal object may results in an adjustment to the tuning of the tx coil, which in turn impact the power transfer efficiency between the transmitting coil and the receiving coil, however, a parallel configuration may provide slightly lower efficiency due to the impedance transformation characteristic of the parallel connection. This characteristic can be helpful for power amplifier that connects to the coil as more devices under charge are added yielding a relatively higher impedance presented to the power amplifier.

The aspects of capacitive elements, either in series as illustrated at 108 of FIGS. 1A and 1B, or in parallel as illustrated at 204 in FIGS. 2A and 2B may be implemented in any suitable design. Some example designs are discussed below.

Figure 3:
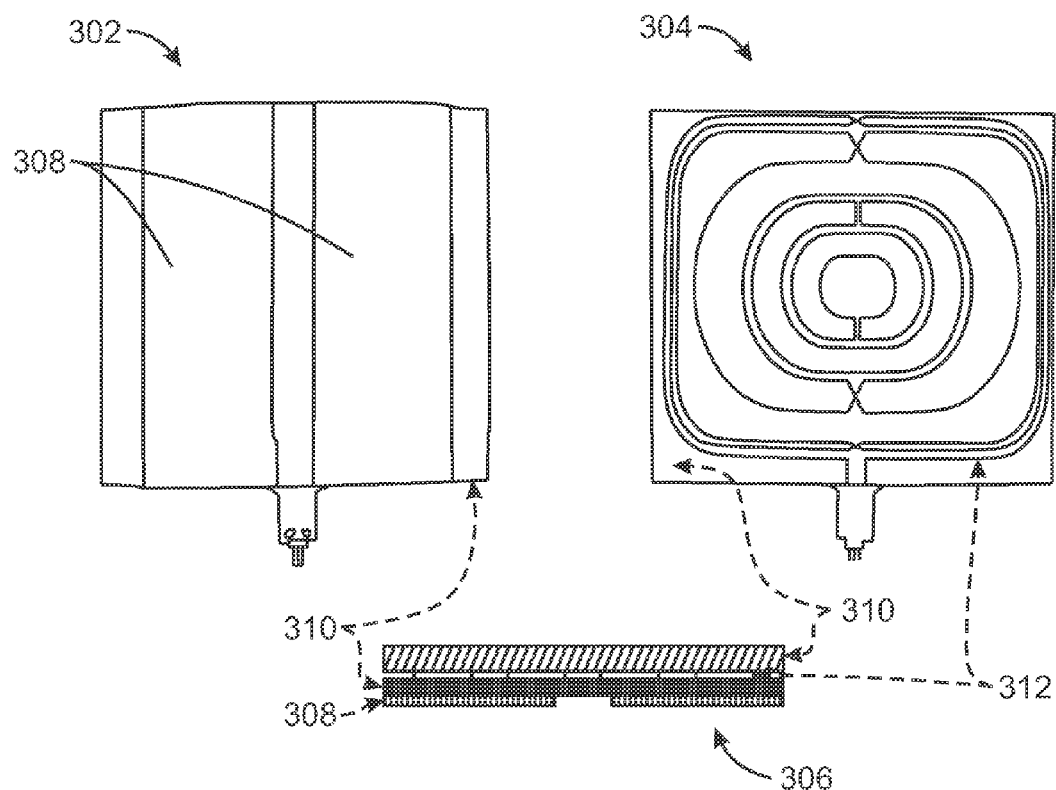
FIG. 3 is a diagram illustrating an example power transmitting unit having a capacitive element.

FIG. 3 is a diagram illustrating an example power transmitting unit having a capacitive element. A bottom side view of the power transmitting unit 300 is illustrated at 302, a top side view of the power transmitting unit 300 is illustrated at 304, and a cross-sectional view of the power transmitting unit is illustrated at 306. The power transmitting unit 300 includes a capacitive element including two conductive electrode plates 308 as illustrated in the bottom view 302 and the cross-sectional view 306. In some aspects, the conductive electrode plates 308 may be copper, or any other suitable conductive material. The electrode plates 308 may be communicatively coupled to a Tx tuning circuit configured to tune the power transmitting unit 300. In other aspects, the conductive electrode plates 308 can be patterned such that equal overlap area is achieved regardless of placement of a device under charge. Ferrite material 310 is also used between the electrode plates and the coil to reduce the effect of the added metal electrode plate to the coil, however, the ferrite material 310 may be eliminated by adopting certain patterns on the electrode such that it does not impact the Tx coil's performance. Further, a dielectric overlay 310 may enable the conductive electrode plates 308 to capacitively compensate for at least a portion of an offset in inductance caused by the conductive component of the device under charge. For example, a device having a receiving coil may be placed on the top of the power transmitting unit 300 to be inductively coupled to a Tx coil 312 as illustrated in the top view 304 and the cross-sectional view 306 of FIG. 3.

In some scenarios, the coupling capacitance of the conductive electrode plates 308 may depend on the distance between the conductive electrode plates 308 and the conductive components of a device under charge. Further, in some aspects, the coupling capacitance of the conductive electrode plates 308 may depend on the size of the device under charge. In the aspects described herein, a strategic distance, electrode size, a dielectric overlay material, and the like, may be selected based on an average distance of a conductive component of a device under charge for multiple types of devices under charge, for multiple models of devices under charge, and the like. Further, in some other aspects, a strategic distance, electrode size, a dielectric overlay material, and the like, may be selected such that multiple devices under charge may be coupled to the Tx coil 312, as discussed in more detail in reference to FIG. 6B.

Figure 4A:
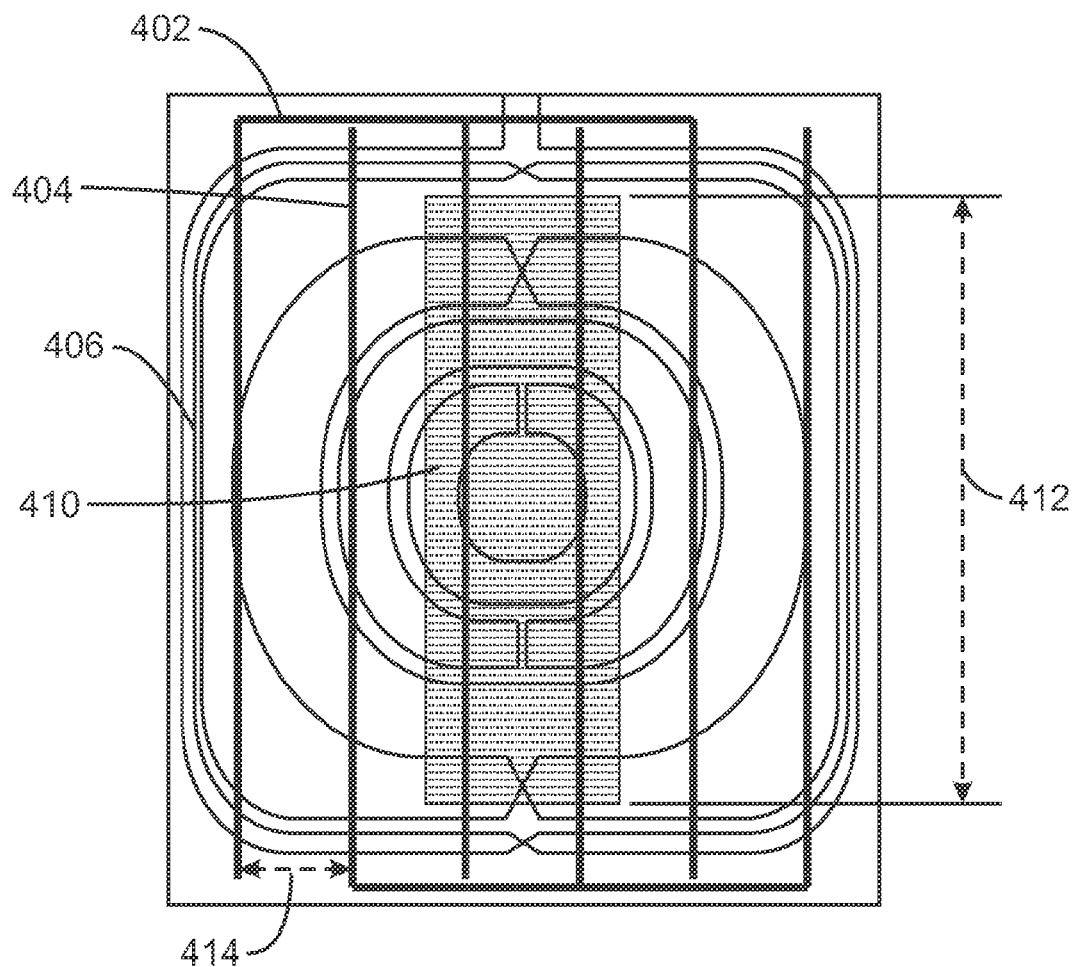
FIG. 4A is an example diagram of top view of a power transmitting unit having a capacitive element formed in an interdigit pattern.

FIG. 4A is an example diagram of a top view of a power transmitting unit having a capacitive element formed in an interdigit pattern. As illustrated in FIG. 4, multiple capacitive elements, such as capacitive coupling plates 402, 404 are included in the power transmitting unit 400A. The capacitive coupling plates 402, 404 may be disposed underneath a dielectric overlay material, similar to the dielectric overlay 310 of FIG. 3. In this example, the capacitive coupling plates 402, 404 are disposed on top of a Tx coil 406 of the power transmitting unit 400A. As illustrated in FIG. 4A, a spaced interdigit pattern is used to reduce the interference to the magnetic field generated by the Tx coil 406 beneath it. The capacitive coupling plate 402 includes multiple arms that are connected together, and the arms are interleaved with the capacitive coupling plate 404 having a similar structure. As discussed in more detail below, when a device under charge, indicated by the box 410, is placed on the power transmitting unit 400, the capacitance of the capacitive coupling plates 402, 404 may depend on the length 412 of the device under charge 410, and a spacing 414 between capacitive coupling plates 402, 404.

Figure 4B:
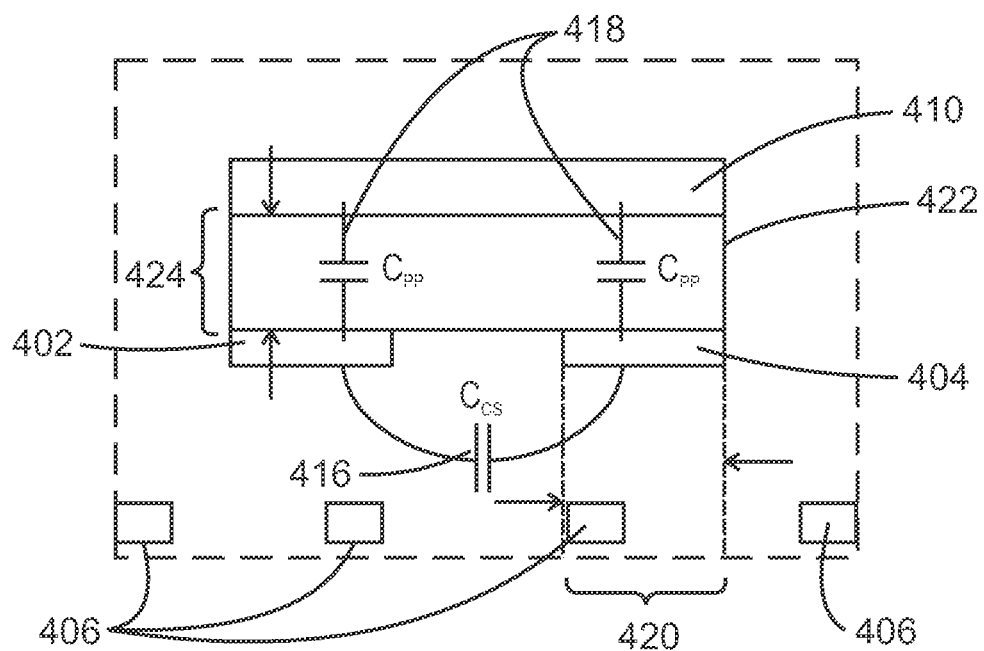
FIG. 4B is a cross-sectional view of the power transmitting unit having a capacitive element formed in an interdigit pattern.

FIG. 4B is a cross-sectional view of the power transmitting unit having a capacitive element formed in an interdigit pattern. The capacitive coupling plates 402, 404 are illustrated in FIG. 4B, as well as turns of the Tx coil 406. Between adjacent capacitance coupling plates 404, 406, a coplanar strip capacitance Ccs is formed, as indicated by 416 in FIG. 4B. When a device under charge 410 is placed on top of the power transmitting unit 400B, parallel plate capacitances ($C_{pp}$) at 418 are formed between a conductive component in the device under charge 410 and the capacitive coupling plates 402, 404 covered by the device under charge 410. The capacitances of the capacitive coupling plates 402, 404 may be determined by Equation 5, 6, and 7 below.

$$C_{cs} = \varepsilon_0 \varepsilon_r l \frac{K\sqrt{1-k^2}}{K(k)} \quad \text{Eq. 5}$$

-continued $$k = \frac{s}{2w+s} \qquad \text{Eq. 6}$$

$$C_{pp} = \frac{\varepsilon_0 \varepsilon_r w l}{d} \qquad \text{Eq. 7}$$

In the equations above, K is the complete elliptical integral of the first kind, "l" is the length of the device under charge as indicated by the dashed arrow 412, "w" is the width of each coupling plate 420, "s" is the spacing between adjacent capacitive coupling plates 402, 404 as indicated by the dashed arrow 414 in FIG. 4A above, and "d" is a dielectric overlay 422 thickness as indicated by the bracket at 424. A combination of above parameters may be used to fulfill conditions of constant resonance frequency, as indicated by Equation 8.

$$L(C_s+C_{cs})=L'(C_s+C_{cs}+C_{pp})=L''(C_s+C_{cs}+2C_{pp})=L'''(C_s+C_{cs}+3C_{pp}) \qquad \text{Eq. 8}$$

In Equation 8, L', L" and L''' each represent the detuned Tx coil inductance when 1, 2, and 3 devices under charged are placed on top of the Tx coil at a pre-defined separation distance "D." In one example, the width "w" is 2 millimeters (mm), the thickness "d" of the dielectric overlay is 1.3 mm, the length of the length "l" 412 of the device under charge 410 is 120 mm, the spacing "s" 414 between adjacent capacitive coupling plates 402, 404 is 35 mm, and the separation between devices under charge "D" is 6 mm.

Figure 5A:
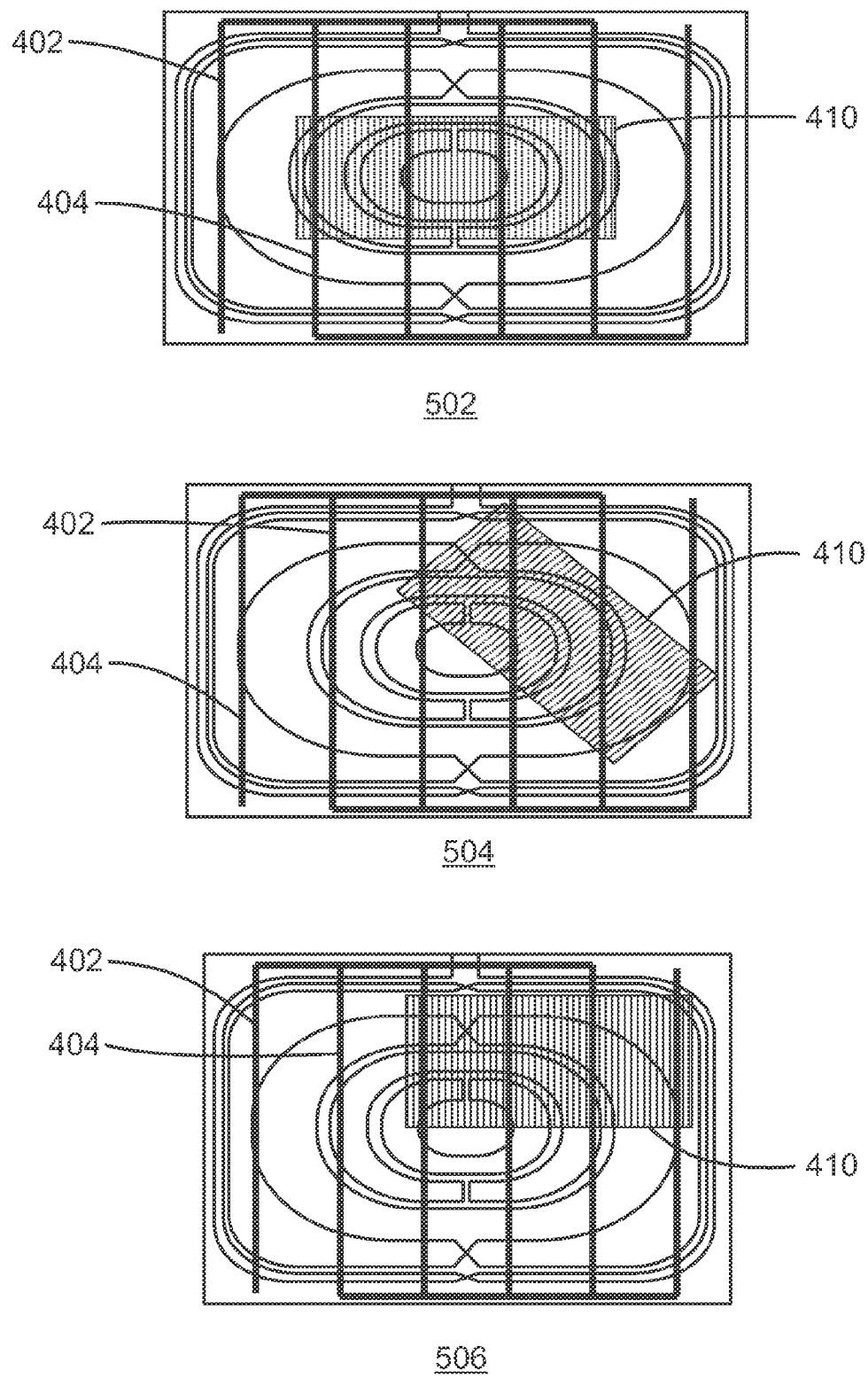
FIG. 5A illustrates top views of a power transmitting unit and a device under charge at different orientations.

FIG. 5A illustrates top views of a power transmitting unit and a device under charge at different orientations. The capacitive coupling plates 402, 404 are strategically spaced to offers great position flexibility, such that no matter what orientation/location the device under charge 410 is placed, there is always about same amount of overlap between the device under charge and the two coupling plates 402, 404, as indicated at each of 502, 504, 506.

Figure 5B:
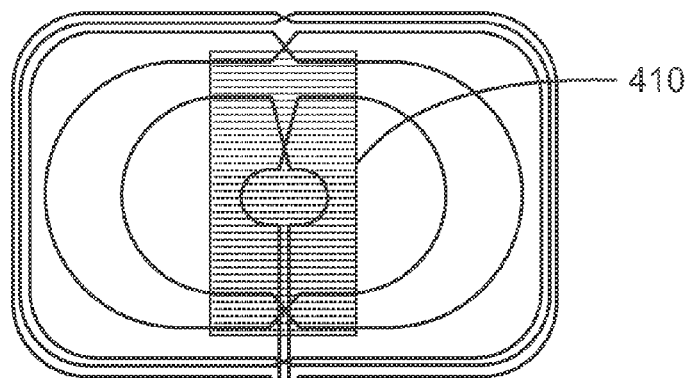
FIG. 5B illustrates a top view of a power transmitting unit and multiple devices under charge.
Figure 5B:
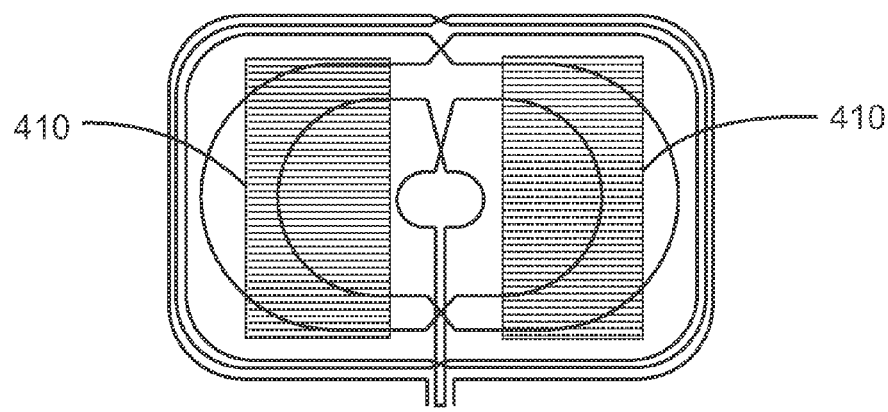
Figure 5B:
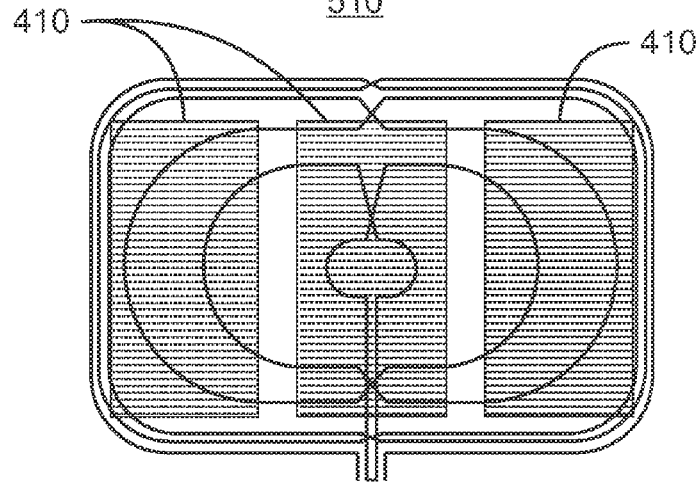

FIG. 5B illustrates a top view of a power transmitting unit and multiple devices under charge. The detuning effect of a conductive component, such as a metal object within a device under charge 410 may be amplified when multiple devices under charge having conductive components are placed on the power transmitting unit. In some aspects, the techniques described herein may compensate for additional conductive components in multiple devices under charge 410 as indicated by 508, 510, 512.

Figure 6:
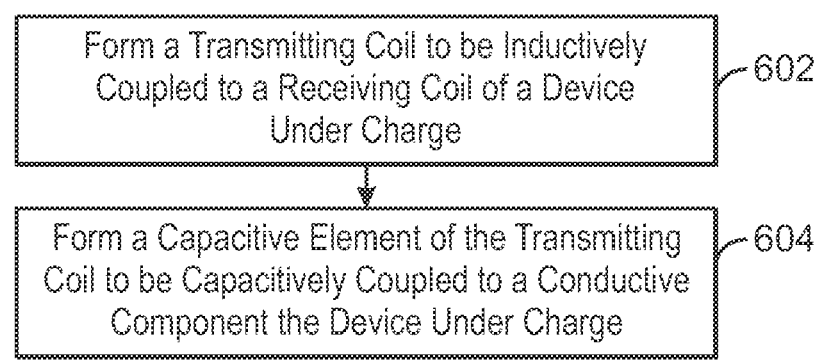
FIG. 6 is a block diagram illustrating a method for forming a power transmitting unit having a capacitive element.

FIG. 6 is a block diagram illustrating a method for forming a power transmitting unit having a capacitive element. At block 602, the method 600 includes forming a transmitting coil to be inductively coupled to a receiving coil of a device under charge (DUC). At block 604, the method 600 includes forming a capacitive element of the transmitting coil to be capacitively coupled to a conductive component in the DUC.

As discussed above, the capacitive element may be formed in a parallel configuration, a series configuration, or any combination thereof. In any of these configurations, the inductive coupling between the Tx coil and the Rx coil may be affected by a change in a resonance frequency the Tx coil due to the interaction of the Tx coil and the conductive elements of the DUC. Further, a change in resonance frequency may affect an efficiency of power transfer between the Tx coil and the Rx coil. In some scenarios, the capacitive element is formed as electrode plates below the coil. In other scenarios, the capacitive element is formed as a plurality of plates in an interdigit pattern.

Figure 7:
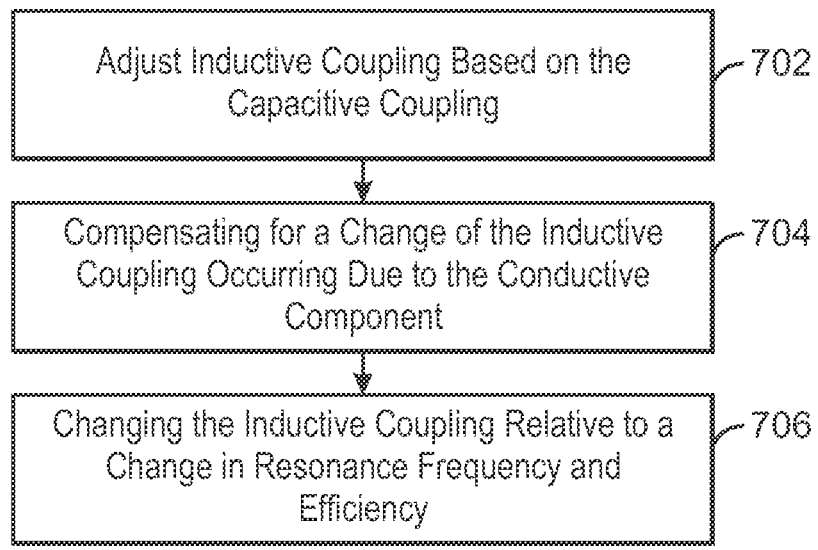
FIG. 7 is illustrating a method of capacitive coupling in a wireless power system.

FIG. 7 is illustrating a method of capacitive coupling in a wireless power system. As discussed above, a power-transmitting unit may be inductively coupled to a power-receiving unit. However, a conductive component of the power-receiving unit may interfere with the inductive coupling. At block 702, an inductive coupling between a power transmitting unit and a power-receiving unit may be adjusted by a capacitive coupling between the capacitive element formed at 602, coupled to the conductive component. At 704, a change in inductive coupling, such as during the adjustment 702, compensates for a change due to the conductive component. At 706, the changing the inductive coupling may be relative to a change in resonance frequency and efficiency. The capacitive coupling between the formed capacitive element and the conductive component of the DUC results in an adjustment to the resonant frequency of the Tx coil, and therefore the inductive coupling between the Tx coil and the Rx coil.

EXAMPLE 1

The techniques described herein relate generally to wireless transmission and creating a capacitive means, such as a capacitive element to couple with conductive components of a device under charge (DUC). For example, a DUC may have various conductive components, such as metal in the frame of the DUC, that may throw off the inductive coupling intended between the transmitting coil and a receiving coil of the DUC.

EXAMPLE 2

The techniques described herein may include a wireless charging component including a transmitting coil and a capacitive means, such as a capacitive element to be coupled to a conductive component of a device under charge (DUC). While the transmitting coil is to be inductively coupled to a receiving coil of the DUC, the capacitive means adjusts for inductive coupling disruption by the conductive component(s) of the DUC.

EXAMPLE 3

The techniques described herein may include a wireless power receiving unit of a device under charge (DUC). The receiving unit may include a receiving coil to be inductively coupled to a transmitting coil of a power transmitting unit. The receiving unit may include a conductive component, such as a metal frame, or other computing component of the DUC that is to capacitively couple to a capacitive element of a transmitting coil. The capacitive coupling between the conductive component and the capacitive element may adjust for disruption in an inductive coupling between the receiving coil and the transmitting coil that may otherwise occur due to the conductive element of the DUC.

EXAMPLE 4

The techniques described herein may include a wireless power transmitting unit including a transmitting coil and a capacitive element. A receiving unit may include a receiving coil to be inductively coupled to the transmitting coil. The receiving unit may include a conductive component, such as a metal frame, or other computing component of the DUC that is to capacitively couple to the capacitive element. The capacitive coupling between the conductive component and the capacitive element may adjust for disruption in an inductive coupling between the receiving coil and the transmitting coil that may otherwise occur due to the conductive element of the DUC.

Not all components, features, structures, characteristics, etc. described and illustrated herein need be included in a particular examples or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of forming a wireless power transmitting unit, comprising:
   forming a transmitting coil to be inductively coupled to a receiving coil of a device under charge (DUC);
   forming a plurality of electrode plates comprising a plurality of arms of a first electrode plate interleaved with a plurality of arms of a second electrode plate; and
   forming a capacitive element of the transmitting coil to be capacitively coupled to a conductive component of the DUC, the capacitive element of the transmitting coil to adjust a resonance frequency of the transmitting coil in response to a change in the resonance frequency of the transmitting coil caused by the conductive component of the DUC.

2. The method of claim 1, further comprising adjusting inductive coupling based on the capacitive coupling.

3. The method of claim 2, further comprising compensating for a change of the inductive coupling occurring due to the conductive component.

4. The method of claim 3, further comprising changing the inductive coupling relative to a change in resonance frequency and efficiency.

5. The method of claim 1, further comprising forming the capacitive element in series with the transmitting coil.

6. The method of claim 1, further comprising forming the capacitive element in parallel.

7. The method of claim 1, further comprising forming electrode plates below the coil.

8. The method of claim 1, further comprising forming electrode plates above the coil.

9. A wireless charging component, comprising:
   a transmitting coil to be inductively coupled to a receiving coil of a device under charge (DUC); and
   wherein the transmitting coil comprises a capacitive element that is configured to capacitively couple to a conductive component of the DUC and adjust a resonance frequency of the transmitting coil in response to a change in the resonance frequency of the transmitting coil caused by the conductive component of the DUC, and wherein the capacitive element comprises a plurality of electrode plates formed between the transmitting coil and a dielectric cover for the transmitting coil, wherein the electrode plates comprise a plurality of arms of a first electrode plate interleaved with a plurality of arms of a second electrode plate.

10. The wireless charging component of claim 9, wherein the capacitive element and the conductive component are capacitively coupled to adjust the inductive coupling between the transmitting coil and the receiving coil.

11. The wireless charging component of claim 10, wherein the adjustment at least partially compensates for a change of the inductive coupling occurring due to the conductive component of the DUC.

12. The wireless charging component of claim 11, wherein the change of the inductive coupling is related to a change in a resonance frequency of the transmitting coil and an efficiency of power transfer between the transmitting coil and the receiving coil.

13. The wireless charging component of claim 9, wherein the capacitive element is disposed in series in the transmitting coil.

14. The wireless charging component of claim 9, wherein the capacitive element is disposed in parallel to the transmitting coil.

15. The wireless charging component of claim 9, wherein the capacitive element comprises an electrode plate formed below the transmitting coil.

16. The wireless charging component of claim 9, wherein the capacitive element comprises an electrode plate formed above the transmitting coil.

17. A wireless power receiving unit of a device to be under charge (DUC), comprising:
   a receiving coil configured to inductively couple to a transmitting coil of a power transmitting unit, wherein the power transmitting unit comprises a capacitive element comprising a plurality of electrode plates formed between the transmitting coil and a dielectric cover for the transmitting coil, wherein the electrode plates comprise a plurality of arms of a first electrode plate interleaved with a plurality of arms of a second electrode plate;
   a conductive component of the DUC configured to capacitively couple to the capacitive element of the transmitting coil, the capacitive element of the transmitting coil to adjust a resonance frequency of the transmitting coil in response to a change in the resonance frequency of the transmitting coil caused by the conductive component of the DUC.

18. The wireless power receiving unit of claim 17, wherein the capacitive element to the conductive component are capacitively coupled to adjust the inductive coupling between the transmitting coil and the receiving coil.

19. The wireless power receiving unit of claim 18, wherein the adjustment at least partially compensates for a change of the inductive coupling occurring due to the conductive component of the DUC.

20. A wireless power transmitting unit, comprising
a transmitting coil configured to inductively couple to a receiving coil of a device under charge (DUC), and to operate with a conductive element of the DUC to reduce the inductive coupling between the transmitting coil and the receiving coil; and
a capacitive element of the transmitting coil that is configured to capacitively couple to the conductive component of the DUC, and to compensate for the reduction of the inductive coupling of the conductive component of the DUC by adjusting a resonance frequency of the transmitting coil in response to a change in the resonance frequency of the transmitting coil caused by the conductive component of the DUC, wherein the capacitive element comprises a plurality of electrode plates formed between the transmitting coil and a dielectric cover for the transmitting coil, wherein the electrode plates comprise a plurality of arms of a first electrode plate interleaved with a plurality of arms of a second electrode plate.

21. The wireless power transmitting unit of claim 20, wherein the reduction of the inductive coupling is related to a change in a resonance frequency of the transmitting coil and an efficiency of power transfer between the transmitting coil and the receiving coil.

22. The wireless power transmitting unit of claim 20, wherein the capacitive element is disposed in series to the transmitting coil, or wherein the capacitive element is disposed in parallel to the transmitting coil.

23. The wireless power transmitting unit of claim 20, wherein the capacitive element comprises an electrode plate formed below the transmitting coil.

24. The wireless power transmitting unit of claim 20, wherein the capacitive element comprises an electrode plate formed above the transmitting coil.

* * * * *